(12) United States Patent
Lisch, Jr. et al.

(10) Patent No.: US 10,377,073 B2
(45) Date of Patent: Aug. 13, 2019

(54) FORMING HEAD SEAL

(71) Applicant: DISCMA AG, Hunenberg (CH)

(72) Inventors: G. David Lisch, Jr., Jackson, MI (US); Frederick C. Beuerle, Jackson, MI (US)

(73) Assignee: Discma AG, Zürich (CH)

( * ) Notice: Subject to any disclaimer, the term of this patent is extended or adjusted under 35 U.S.C. 154(b) by 232 days.

(21) Appl. No.: 15/323,315

(22) PCT Filed: Jun. 30, 2014

(86) PCT No.: PCT/US2014/044787
§ 371 (c)(1),
(2) Date: Dec. 30, 2016

(87) PCT Pub. No.: WO2016/003391
PCT Pub. Date: Jan. 7, 2016

(65) Prior Publication Data
US 2017/0144356 A1     May 25, 2017

(51) Int. Cl.
| | | |
|---|---|---|
| *B29C 49/06* | (2006.01) |
| *B29C 49/12* | (2006.01) |
| *B29C 49/46* | (2006.01) |
| *B29C 49/56* | (2006.01) |
| *B29C 49/58* | (2006.01) |
| B29C 49/02 | (2006.01) |
| B29C 49/42 | (2006.01) |

(52) U.S. Cl.
CPC .............. *B29C 49/06* (2013.01); *B29C 49/12* (2013.01); *B29C 49/46* (2013.01); *B29C 49/56* (2013.01); *B29C 49/58* (2013.01); *B29C 2049/023* (2013.01); *B29C 2049/4294* (2013.01); *B29C 2049/4664* (2013.01); *B29C 2049/5868* (2013.01)

(58) Field of Classification Search
None
See application file for complete search history.

(56) References Cited

U.S. PATENT DOCUMENTS

| | | |
|---|---|---|
| 6,514,451 B1 | 2/2003 | Boyd et al. |
| 2013/0164404 A1 | 6/2013 | Maki et al. |

FOREIGN PATENT DOCUMENTS

| | | |
|---|---|---|
| WO | 1997/13632 A1 | 4/1997 |
| WO | 2007/093032 A1 | 8/2007 |
| WO | 2013/096609 A1 | 6/2013 |

*Primary Examiner* — Monica A Huson
(74) *Attorney, Agent, or Firm* — Eric J. Sosenko; Jonathan P. O'Brien; Honigman LLP (57) ABSTRACT

A one-step hydraulic blow molding system and method for forming a preform and a liquid filled container from the preform. The machine and method include a sealing mechanism that forms a seal primarily utilizing compressive forces in an axial direction to prevent the leakage of liquid blow medium. The sealing mechanism includes an axial end face of a forming head and an upper axial surface of a neck ring.

24 Claims, 6 Drawing Sheets

FORMING HEAD SEAL

CROSS-REFERENCE TO RELATED APPLICATIONS

This application is the U.S. national phase of PCT Application No. PCT/US2014/044787 filed on Jun. 30, 2014, the disclosure of which is incorporated in its entirety by reference herein.

BACKGROUND

1. Field of the Invention

The present invention generally relates to a hydraulic blow system employing a one-step container molding process wherein a preform is initially formed in a machine and a container is subsequently molded in the same machine or at a different machine while utilizing the latent heat, from the initial forming of the preform, in the subsequent forming of the container. More specifically, the invention relates to sealing of the forming head with the preform during the hydraulic blow molding process used to form the container.

2. Description of Related Art

Plastic containers for liquid products are manufactured by various different methods. In some methods, a plastic preform is injection molded in a preform molding machine and subsequently cooled to ambient temperatures. In a second machine, which may be in a remote location, the preform is re-heated to a suitable temperature for molding, placed within a mold and then expanded, axially and radially, to form a container. Such a process is known as a two-step molding process, and a corresponding system is known as a two-step system.

In another process, the injection molding of the preform and the subsequent forming of the container all occur in the same machine or in different machines, but without allowing the preform to significantly cool and require reheating. Such processes and systems are correspondingly known as one-step processes and systems.

In either of the above processes, air may be used as the blow medium to axially and radially expand the preform and form the container. When forming the container with air, the forming head is provided with a sealing collar that extends interiorly along the finish of the preform. The sealing collar engages the inner diameter of the finish and establishes establish an interference fit or seal between the forming head and the preform. Additionally, when the container is formed by injecting pressurized air, the sealing mechanism between the air injection head and the preform only needs preventing from excessive air leaks. The need is to reduce the quantity of highly pressurized air requested for forming the container and to reduce noise.

Instead of air as the blow medium, newer processes use the liquid end product as the blow medium. This process is herein referred to as hydraulic blow molding. With hydraulic blow molding, if the seal between the forming head and the preform is insufficient to retain the liquid blow medium, the leaked liquid blow medium may contaminate various surfaces of the molding machines components, which may in turn inhibit or disrupt the further manufacture of preforms and containers. As a result, the contaminated machine may experience downtime and require extensive cleaning, both of which are undesirable from a production standpoint.

U.S. patent publication no. US2013/0164404 describes a sealing system for forming a container from a preform with a forming fluid which may be liquid. The sealing system is provided with two sealing engagements. An elastomeric seal extends between the blow nozzle and the finish of the preform. A valve system can be used to remove residual liquid between the elastomeric seal and the second seal engagement.

In view of the above, it is apparent that there is a need for a robust sealing strategy in one-step hydraulic blow molding machines or systems.

SUMMARY

In satisfying the above need, as well as overcoming the enumerated drawbacks and other limitations of the related art, the present invention provides a hydraulic blow molding system for forming a preform and a plastic container from the preform during a one-step container molding process by injecting a liquid product into the preform, the system comprising: an injection core having exterior surfaces defining an interior shape of the preform; a preform mold assembly having interior surfaces cooperating to defining an exterior shape of the preform; a neck ring including radially inward facing surfaces defining a finish of the preform; a forming head including an injection nozzle, the injection nozzle defining a central passageway terminating in an exit orifice, the central passageway defining a central axis (Z) therethrough; a source of liquid blow medium coupled to the central passageway of the forming head; a container mold assembly having interior surfaces cooperating to define a mold cavity in the shape of the plastic container and within which a body of the preform is received; the hydraulic blow molding system characterized by a sealing mechanism associated with the forming head, whereby the forming head is configured to apply a sealing force in an axial direction, the forming head engaging the neck ring and the sealing mechanism including a primary seal defined between an axial end face of the forming head and an upper axial face of the neck ring to form a seal whereby molding medium injected into the preform through the central passageway to form the container is prevented from passing between the neck ring and the forming head.

Such a system is suitable for a so called "one step container molding process". The neck ring first cooperates with the injection core and the preform mold assembly for molding the preform by plastic injection or the like. Then, the same neck ring can be used for transporting the preform while the preform is still hot. The neck ring cooperates with the container mold assembly and the forming head to form the container within the same step, or the same period of time while the preform is still hot. The system of the invention take advantage of the existence of said neck ring to have the sealing mechanism between said neck ring and the forming head. The successive neck rings are part of the system and can be optimized, in hardness and/or in geometry for example, to provide improved sealing performance when cooperating with the forming head. Contrary to US2013/0164404, the sealing mechanism of the invention is not obliged to cooperate with the plastic preform which may fluctuate at least in geometry.

According to an embodiment, the sealing mechanism is further comprised of a secondary seal, the secondary seal at least partially defined between a top sealing surface of the finish and an axial stop surface of the neck ring.

As the neck ring cooperates with the preform mold assembly, the plastic material flowing between the injection core, the preform mold assembly and the neck ring is in tight contact with the neck ring. This provides a good sealing barrier preventing the further injected liquid product to penetrate between the preform finish and the neck ring during the duration of the container forming. Both primary and secondary seals provide robust sealing between the central passageway and the exterior of the preform.

According to other embodiments, the neck ring includes a flange extending radially inward toward to the central axis (Z), the flange contacting the top sealing surface of the finish of the preform; the flange is coextensive with the top sealing surface; the flange is less than coextensive with the top sealing surface of the finish of the preform; or the sealing mechanism includes a sealing member engaging the flange.

The sealing effectiveness of such sealing member cumulates the sealing effectiveness of the primary seal. The cycle time for forming the container with the pressurized liquid product is short, for example between 0.2 s to 20 s, preferably between 1 s to 2 s. Additionally, the sealing member and the primary seal may extend each along a seal circle. Both seal circles may be almost concentric to each other. So the quantity of forming liquid product which may pass through both the sealing member and the primary seal is almost null.

Additionally, the above seal circles may be radially pretty close to each other, the quality of liquid trapped between the primary seal and the sealing member is also almost null. There is no need to remove it.

According to another embodiment, the sealing member is supported on the forming head.

According to another embodiment, the sealing member is provided in a sealing groove defined in the forming head.

According to another embodiment, the sealing member axially engages a face of the flange, the face being generally perpendicular to the central axis.

According to another embodiment, the sealing member engages a radial face of the flange, the radial face being generally parallel to the central axis.

According to another embodiment, the sealing member engages a radial face of the flange and a top sealing surface of the preform.

According to another embodiment, the sealing member engages an axial end surface of the injection head.

According to another embodiment, the sealing mechanism includes an axial face of the forming head and an upper axial surface of the neck ring.

According to another embodiment, the primary seal is formed exclusively by the axial end face of the forming head and an upper axial surface of the neck ring.

According to another embodiment, a seal pin being located in the central passageway and being axially moveable between an extended position and a retracted position along the central axis, in the extended position the seal pin engaging the injection nozzle and sealing off the exit orifice, in the retracted position the seal pin being disengaged from the injection nozzle and permitting the injection of blowing medium through the exit orifice and into the preform.

According to another embodiment, the neck ring is a thread split made of two halves adapted to form the threads of the neck and to be removed from the neck after the container forming.

According to another aspect, the invention further relates to a hydraulic blow molding method for forming a preform and a plastic container from the preform during a one-step container molding process by injecting a liquid product into the preform, the method comprising the steps of: forming a preform in a preform forming station by injecting a plastic material into a preform mold assembly having interior surfaces cooperating with an injection core and a neck ring to defining a shape of the preform; retaining the preform in the neck ring and transferring the preform to a container molding station; injecting a liquid end product into the preform to cause expansion of the preform to form a liquid filled container; the method characterized by compressively engaging an axial end face of the forming head with an upper axial surface of the neck ring forming a primary seal of a sealing mechanism in which a sealing force is applied in an axial direction of the preform; whereby the liquid end product injected into the preform to form the container is prevented from passing between the neck ring and the forming head.

In a further aspect of the invention, the method includes the step of forming a secondary seal between a top sealing surface of the preform and an axial surface of the neck ring.

In a further aspect of the invention, the axial surface of the neck ring is defined on a flange of the neck ring extending over the top sealing surface of the preform.

In another aspect of the invention, the axial surface of the neck ring is defined on a flange of the neck ring extending only partially over the top sealing surface of the preform.

In yet another aspect of the invention, the method includes the step of engaging a sealing member between the neck ring and the forming head.

In a further aspect of the invention, the sealing member is engaged with a radial surface of the neck ring.

In another aspect of the invention, the sealing member is engaged with an axial surface of the neck ring.

In still another aspect of the invention, the sealing member is engaged with a chamfered surface of the neck ring.

Further objects, features and advantages of this invention will become readily apparent to persons skilled in the art after a review of the following description, with reference to the drawings and claims that are appended to and form a part of this specification.

DETAILED DESCRIPTION

As used in the description that follows, directional terms such as "upper" and "lower" are used with reference to the orientation of the elements as presented in the figures, with "upper" indicating a direction towards the top of the figure and with "lower" indicating a direction towards the bottom of the figure. Similarly, the terms "inward" or "inner" and "outward" or "outer" indicate a direction that is generally toward or away from a central axis, which is denoted as Z. An axial surface, accordingly, is one that faces in the axial direction, in other words, in a direction along the central axis Z. A radial surface therefore faces radially, generally away or toward the central axis Z. It will be understood, however, that in actual implementation of a hydraulic blow molding system 10, the directional references used herein may not necessarily correspond with the installation and orientation of the hydraulic blow molding system 10.

Figure 1:
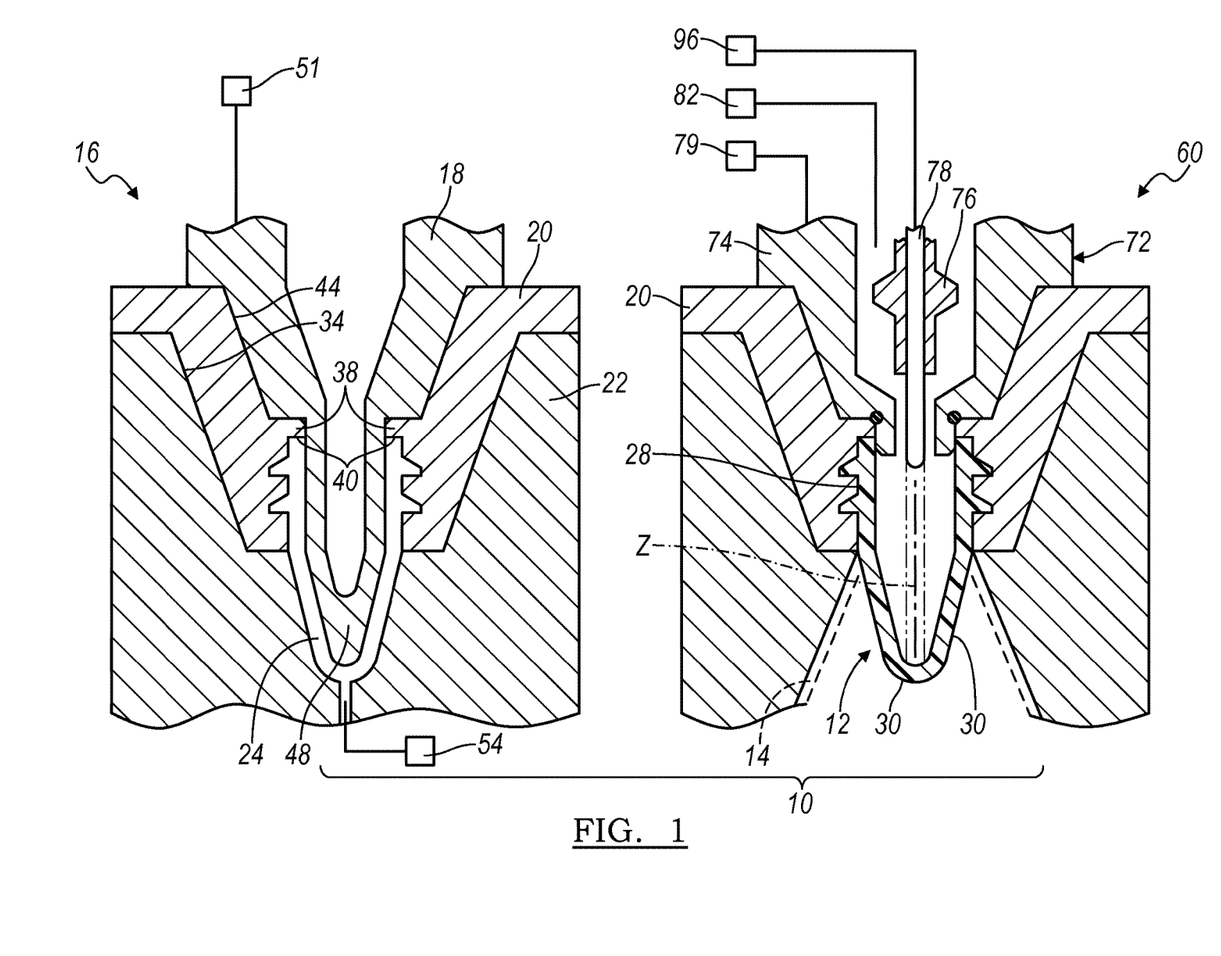
FIG. 1 is a schematic cross-sectional view of one-step hydraulic blow molding system embodying the principles of the present invention.

Referring now to the drawings, a one-step hydraulic blow molding system 10 embodying the principles of the present invention is schematically illustrated in FIG. 1. The station seen on the left side of FIG. 1 is a preform molding station 16 where a preform 12 is injection molded. The station on the right side of FIG. 1 is a container forming station 60 where the preform 12 (formed on the right side of FIG. 1) is hydraulic blow molded into a container 14, which is shown in phantom. Both stations are schematically shown with only those components necessary for an understanding of the present invention. Additional componentry required for operation each of the stations will be readily appreciated by those skilled in the art and is, therefore, not further shown or discussed herein.

Figure 2A:
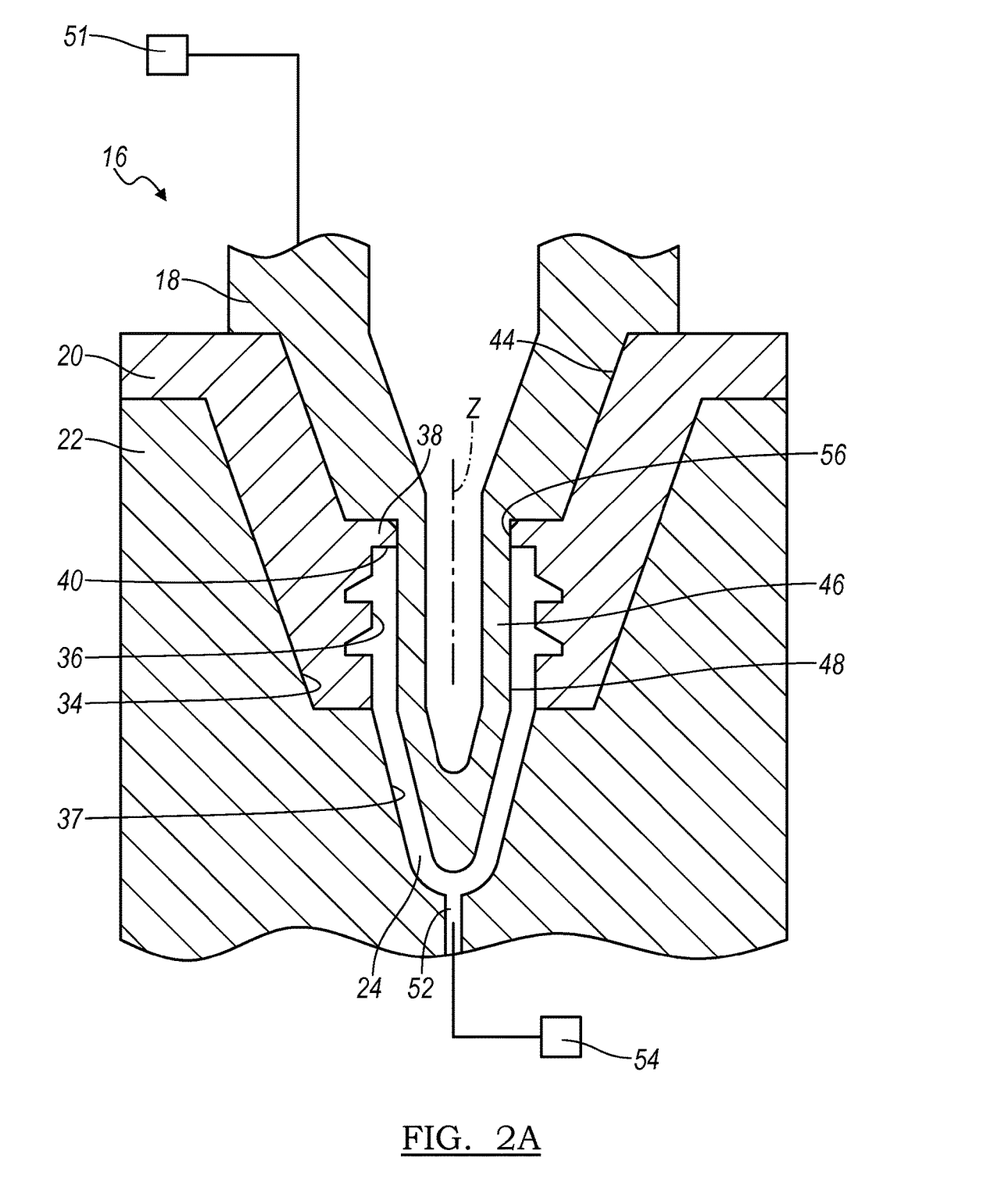
FIG. 2A is an enlarged schematic cross-sectional view of the preform molding station of the one-step hydraulic blow molding system shown on the left-hand side in FIG. 1.

An enlarged view of the preform molding station 16 is also shown in FIG. 2A. The station includes as its primary components an injection core 18, a neck ring 20 and a preform mold assembly 22, all of which cooperate to define an injection cavity 24 in the desired shape of the preform 12. Interior surfaces of the neck ring 20 and the mold assembly 22 cooperate to define the exterior shape of the preform 12, while exterior surfaces of the injection core 18 define the preform's interior shape.

Referring now just to the preform 12, the preform 12 is a one-piece structure having a hollow body 26 that extends generally along the central axis Z from an open end, defined by a neck or finish 28, to a closed end 30. While the body 26 of the preform 12 is elongated and expanded during molding of the container 14, the initial forming of the preform 12 provides the finish 28 in its final form. The finish 28 may include various features, such as threads 32 for engagement with a correspondingly threaded closure cap (not shown) and a support ring (also not shown) to assist in subsequent handling of the preform/container. The preform 12 is preferably formed by way of injection molding from any suitable plastic material, such as polyesters including polyethylene terephthalate (PET), polyethylene naphthalate (PEN), and polyethylene imine (PEI), polyolefins including low and high density polyethylene (LDPE and HDPE, respectively) and polypropylene (PP), styrene based materials including polystyrene (PS), acrylonitrile butadiene styrene (ABS) or other polymers including polyvinyl chloride (PVC). The above listing of materials is for illustrative purposes only and is not intended to limit the scope of the invention or the materials with which the method may be practiced.

As seen in FIG. 2A, at the preform molding station 16, the neck ring 20 is received within a recess 34 in the upper end of the preform mold assembly 22. At the lower end of the neck ring 20, inner surfaces 36 (defining the finish 28) of the neck ring 20 define an opening that corresponds with an opening defined by the inner surfaces 37 (defining the body and closed end 26, 30) of the preform mold assembly 22. At the upper end of the inner surfaces 36, the neck ring 20 includes a flange 38 extending radially inward toward the central axis Z. Extending radially inward, the flange 38 includes a lower axial stop surface 40 that defines the top sealing surface 42 of the subsequently molded finish 28.

The injection core 18 is received within a recess 44 in the upper end of the neck ring 20. Extending from a lowermost end of the injection core 18 is a preform projection 46. The preform projection 46 extends through the neck ring 20 and into the mold assembly 22 such that its exterior surfaces 48 define the interior surfaces of the preform 12. In the present embodiment, the preform projection 46 is straight walled in the area where it passes through the flange 38 and the flange 38 therefore defines the entire top sealing surface 42 of the finish 28, as further discussed below. The parting line between the flange 38 and injection core 18 is therefore defined at a radially inner edge of the preform's top sealing surface 42, generally at the interface of the exterior surface 48 of the preform projection 46 and the lower axial surface 40 of the flange 38.

As is apparent from the figures, the injection core 18, neck ring 20 and mold assembly 22 have corresponding surfaces engaged with one another in surface-to-surface contact that will prevent any injected plastic material from passing between each of these components, other than into the injection cavity 24. This sealing is maintained by an actuator 51, coupled to the injection core 18, that asserts an axial, compressive force on the injection core 18, neck ring 20 and mold assembly 22 to counter pressures that are exerted during the injection of plastic material into the injection cavity 24. The plastic material is injected into the injection cavity 24 through a gate 52 in the preform mold assembly 22. The gate 52 is in turn coupled to an injector 54, which may be any of the known devices for that purpose.

Figure 2B:
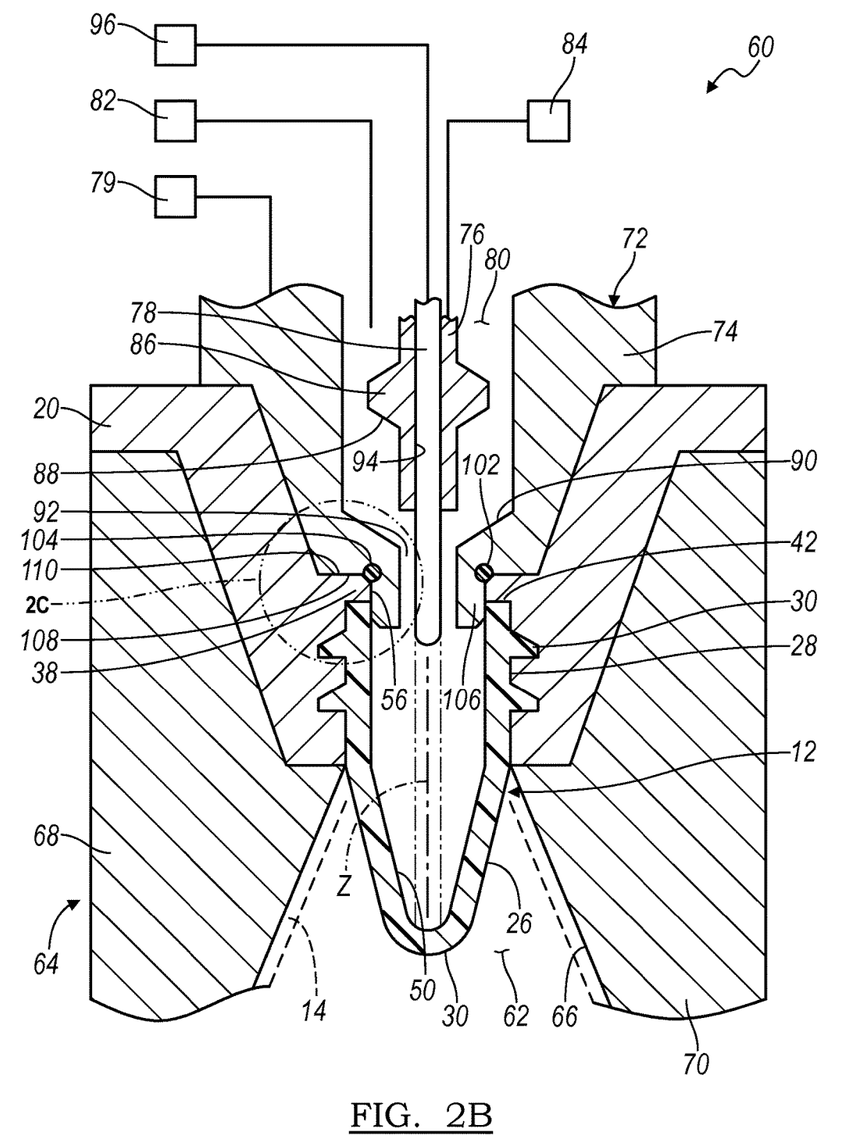
FIG. 2B is an enlarged schematic cross-sectional view of the container forming station of the one-step hydraulic blow molding system shown on the right-hand side in FIG. 1.

Once the plastic material has been injected into the injection cavity 24 and the preform 12 formed, the injection core 18 and the mold assembly 22 disengage from the neck ring 20 and the preform 12 is transferred from the preform molding station 16 to the container forming station 60, which is shown FIG. 2B. In transferring the preform 12 to the container forming station 60, the neck ring 20 remains engaged with the finish 28 of the preform 12. The neck ring 20 is therefore utilized by a transfer mechanism (not shown) to effectuate this transfer. As will be appreciated by those skilled in the art, a variety of such transfer mechanisms are well known.

At the container forming station 60, the neck ring 20 is engaged by the container mold 64 such that the body 26 of the preform 12 is received within a cavity 62 of a container mold 64. The cavity 62 is in the desired shape of the container 14 and is cooperatively defined by interior surfaces 66 of at least two mold halves 68, 70. The mold halves 68, 70 may be opposing to one another and movable relative to each other along an axis substantially perpendicular to the central axis Z. In this way, when the mold halves 68, 70 are opened and pulled away from each other, the preform 12 can be transferred into the container mold 64 and/or the container 14 remove therefrom. When closed about the preform 12, the container mold 64 also closes about the neck ring 20.

The container forming station 60 also includes a forming head 72, which further includes an injection nozzle 74, a seal pin 76 and an optional stretch rod 78. The injection nozzle 74 is axially movable along the central axis Z by an actuator 79 between engaged and disengaged positions with the neck ring 20, the former position being seen in FIG. 2B. The actuator 79 may be any well-known variety of actuator utilized in connection with the molding of plastic containers. Such actuators are often pneumatically driven, but maybe driven by other means including, without limitation, electric motors, servomotors, magnetic or other means.

Defined through the interior of the injection nozzle 74, a central passageway 80 is in communication with a source 82 of the liquid blow medium. The liquid blow medium, as noted above, is the end product provided in the container 14 to the end consumer. When provided to the central passageway 80, the liquid blow medium is pressurized, preferably by one of the well-known devices used for providing pressurized fluids during the molding and filling of containers. These devices include pressure pumps, pistons, servomotors and other appropriate devices.

The seal pin 76 is located within the central passageway 80 and is also movable between extended and retracted positions along the central axis Z. This movement is effectuated by an actuator 84, similar to the actuator 79 associated with the injection nozzle 74. The distal end of the seal pin 76 includes a head 86 having surfaces defining a sealing ring 88 that engages a sealing seat 90 provided on the injection nozzle 74 and located adjacent to an exit orifice 92 thereof. The sealing ring 88 and the sealing seat 90 have complementary conical shapes so that, when engaged, they seal the central passageway 80 and prevent the liquid blow medium from flowing through the exit orifice 92. The shape of the sealing ring 88 and a sealing seat 90 may be shapes other than conical so long as the engagement between the two components prevents the liquid blow medium from flowing through the exit orifice 92.

The stretch rod 78, if provided, extends through a longitudinal bore 92 in the seal pin 76. The stretch rod 78 is also extendable by an actuator 96 (similar to the previously mentioned actuators) out of the seal pin 76, through the exit orifice 92 and into the body 26 of the preform 12. When fully extended, the stretch rod 78 engages closed end 30 of the preform 12 and axially stretches the preform 12 to assist in forming the container 14.

In producing a container 14 from the preform 12, the forming head 72 is initially disengaged from the neck ring 20 and mold 64. At this stage, the seal pin 76 is in its extended position, closing off the exit orifice 92 and preventing the liquid blow medium retained in the central passageway 80 from being dispensed through the forming head 72. The stretch rod 78 is also in a retracted position.

Once the mold 64 has closed about the neck ring 20, properly positioning the preform 12 within the cavity 62, the forming head 72 and the injection nozzle 74 are lowered by the actuator 79 to engage the neck ring 20. The stretch rod 78 is then extended by its actuator 96 to engage the closed-end 30 of the preform 12, and the seal pin 76 is retracted by its actuator 84, opening the exit orifice 92 and allowing the liquid blow medium to be injected into the preform 12. Simultaneously with or in advance of the opening of the exit orifice 92, the stretch rod 78 may be fully extended to impinge the closed end 30 of the preform 12 between the end of the stretch rod 78 and the bottom of the cavity 62. The injection of the liquid blow medium causes the stretched preform to axially expand into conformity with the surfaces of the cavity 62, thereby forming and filling the container 14. Once formed and filled, the filled container 14 may be removed from the mold 64 and the neck ring 20, the latter of which may be formed from two cooperating parts to allow for easy removal of the container 14.

Since the container 14 is simultaneously formed and filled by the liquid blow medium, any liquid blow medium escaping between the injection nozzle 74 and the neck ring 20 could potentially contaminate the various surfaces of the container forming station 60. Should such an event happen, it would require a stoppage in production for the cleaning container forming station 60. As noted previously, such leakage is not a major concern when air is the blow medium.

To minimize the potential for leakage, the construction used in the container forming station 60 of the one-step hydraulic blow molding system 10 includes a sealing mechanism 100 that is robust and relies upon compressive forces, generated in the direction of the central axis Z, between axial faces of the injection nozzle 74, the neck ring 20 and the top sealing surface 42 of the preform 12. The metal-to-metal compressive engagement between the axial faces of the injection nozzle 74 and the neck ring 20 allow for high compressive forces to be exerted without excessive force being applied to the finish 28 or its top sealing surface 42. Thus, the primary sealing force is exerted against the neck ring 20.

Figures 2C, 3, 4:
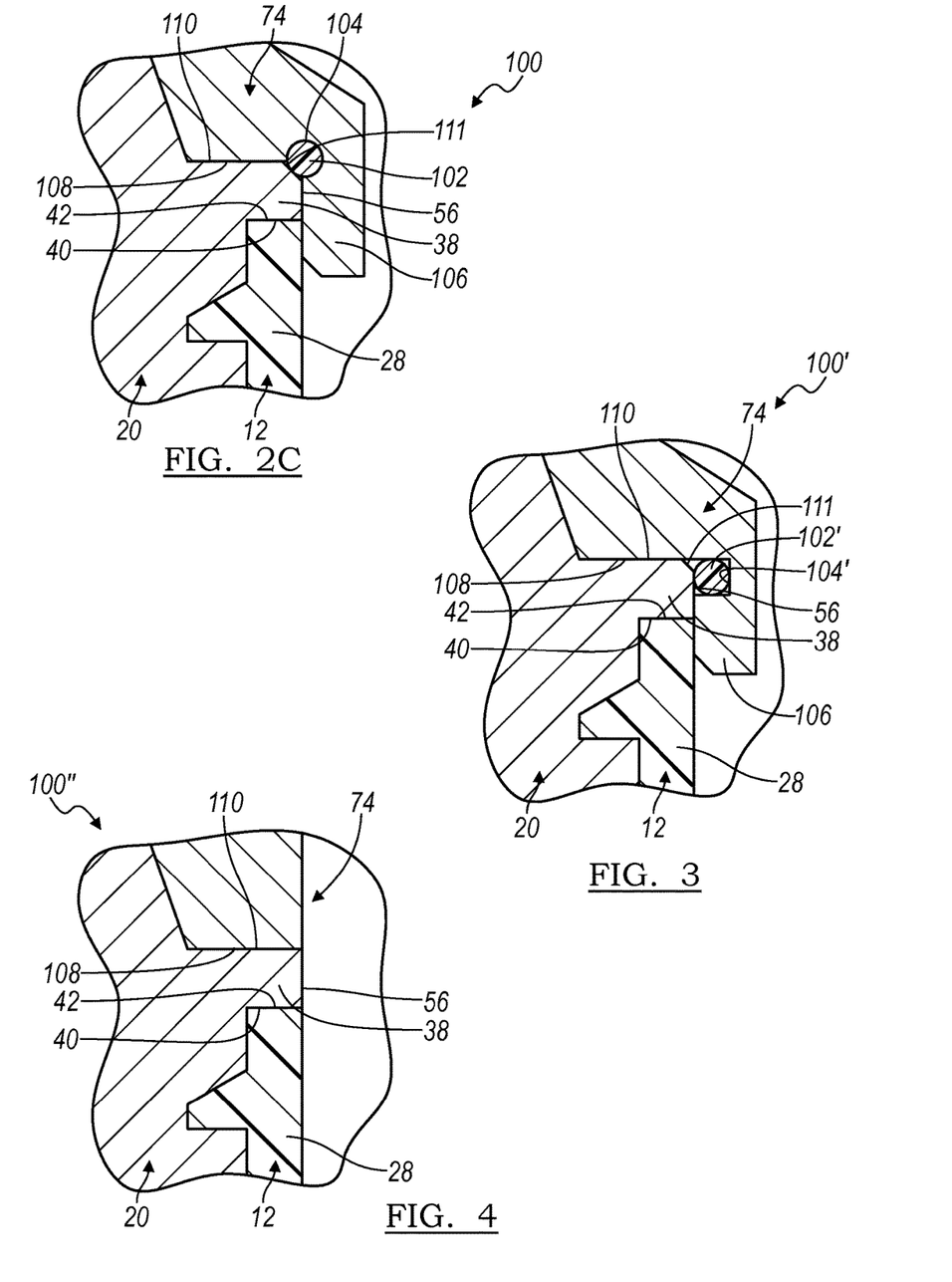
FIG. 2C is an enlarged view of the sealing mechanism of the container forming station enclosed by line 2C-2C in FIG. 2B.
FIG. 3 is a schematic cross-sectional view of a variant of the container forming station seen FIG. 2B.
FIG. 4 is a schematic cross-sectional view of a further variant of the container forming station seen FIG. 2B.

As seen in FIGS. 2B and 2C, a collar 106, which cooperates to define the exit orifice 92 of the injection nozzle 74, extends from a lower axial end face 108 of the injection nozzle 74. The collar 106 extends into the finish 28 and has an outer diameter that substantially approximates the inner diameters of both the flange 38 and the finish 28, thereby forming an interference fit therein. A sealing member 102 is retained in a sealing groove 104 that is provided about the base of the collar 106, generally positioned at the transition of the collar 106 to the axial end face 108 of the injection nozzle 74. With this location, the sealing member 102 is compressively engaged, at least in part, between the axial end face 108 and the upper axial face 110 of the injection nozzle 74 and neck ring 20. More specifically, by generally centering the sealing groove 104 at the transition to the collar 106, upon full advancement of the injection nozzle 74 and engagement of the axial end face 108 and the upper axial face 110, the sealing member 102 is positioned where it will impinge upon an upper corner of the flange 38. This corner of the flange 38 may be rounded or provided as a chamfer 111 to minimize wear on the sealing member 102. The sealing member 102 is therefore compressively engaged between the axial portions of the sealing groove 104 and the chamfer 111, forming an additional positive seal, as part of the sealing mechanism 100 and in conjunction with the compressive engagement between the axial end face 108 of the injection nozzle 74 and the upper axial face 110 of the neck ring. Preferably, the top down compressive forces exerted between the axial end face 108 of the injection nozzle and the upper axial face 110 of the neck ring 20 form the primary sealing of the sealing mechanism 100 of the system 10 during hydraulic blow molding, accounting for approximately 90% of the sealing capabilities, and with compressive forces exerted on the top sealing surface 42 of the finish 28 forming secondary sealing of the sealing mechanism 100 of the system 10, accounting for about 10% of the sealing capabilities.

Variants on the above described sealing mechanism 100 are presented in FIGS. 3 and 4. Since the variants of FIGS. 3 and 4 include numerous elements in common with those discussed above relative to FIGS. 1-2C, those common elements are provided with the same reference numerals and the discussion that follows only concerns the differences exhibited by the variants.

Turning now to FIG. 3, the sealing mechanism 100' is again formed in part by a sealing member 102' retained in a sealing groove 104'. The sealing groove 104', however, is located in a position at the base of the collar 106 that corresponds with the flange's radial inward face 56. The upper extent of the sealing groove 104', accordingly, is flush with the upper axial face 110 of the flange 38 and does not extend beyond that face 110. Additionally, the effective diameter of the sealing member 102' is sized so that it engages the inner diameter defined by the flange 38 to form a positive seal. As a result, the sealing member 102' forms a positive engagement between the radial inward face 56 of the flange 38 and a radial wall 112 of the sealing groove 104', thereby forming a positive seal between the injection nozzle 74 and the neck ring 20. Alternatively, the sealing groove 104' and sealing member 102' could be positioned to also or alternately contact the inner diameter of the finish 28. In addition to the positive seal provided by the sealing member 102', the sealing mechanism 100' of this variant also utilizes the compressive engagement between the axial end face 108 of the injection nozzle 74 and the upper axial face 110 of the neck ring 20 as its primary sealing mechanism and the compressive engagement of the flange 38 on the top sealing surface 42 as its secondary sealing mechanism, as noted previously.

In the variant of FIG. 4, the sealing mechanism 100" is provided without a sealing member or associated sealing groove. Rather, the seal of the sealing mechanism 100" is primarily defined by compressive engagement between the axial end face 108 of the injection nozzle 74 and the upper axial face 110 of the neck ring 20 and secondarily defined by the compressive engagement of the flange 38 on the top sealing surface 42 of the finish 20. As with the prior variants, the flange 38 completely encapsulates or extends over the top sealing surface 42 of the preform 12. Also in this embodiment, the collar 106 of the prior embodiment is eliminated thereby allowing for greater flow of blow medium into the preform 12. The elimination of the collar 106 could also be incorporated in various ones of the other embodiments and variants with slight modifications as to how the seal member 102 is supported.

Figure 5A:
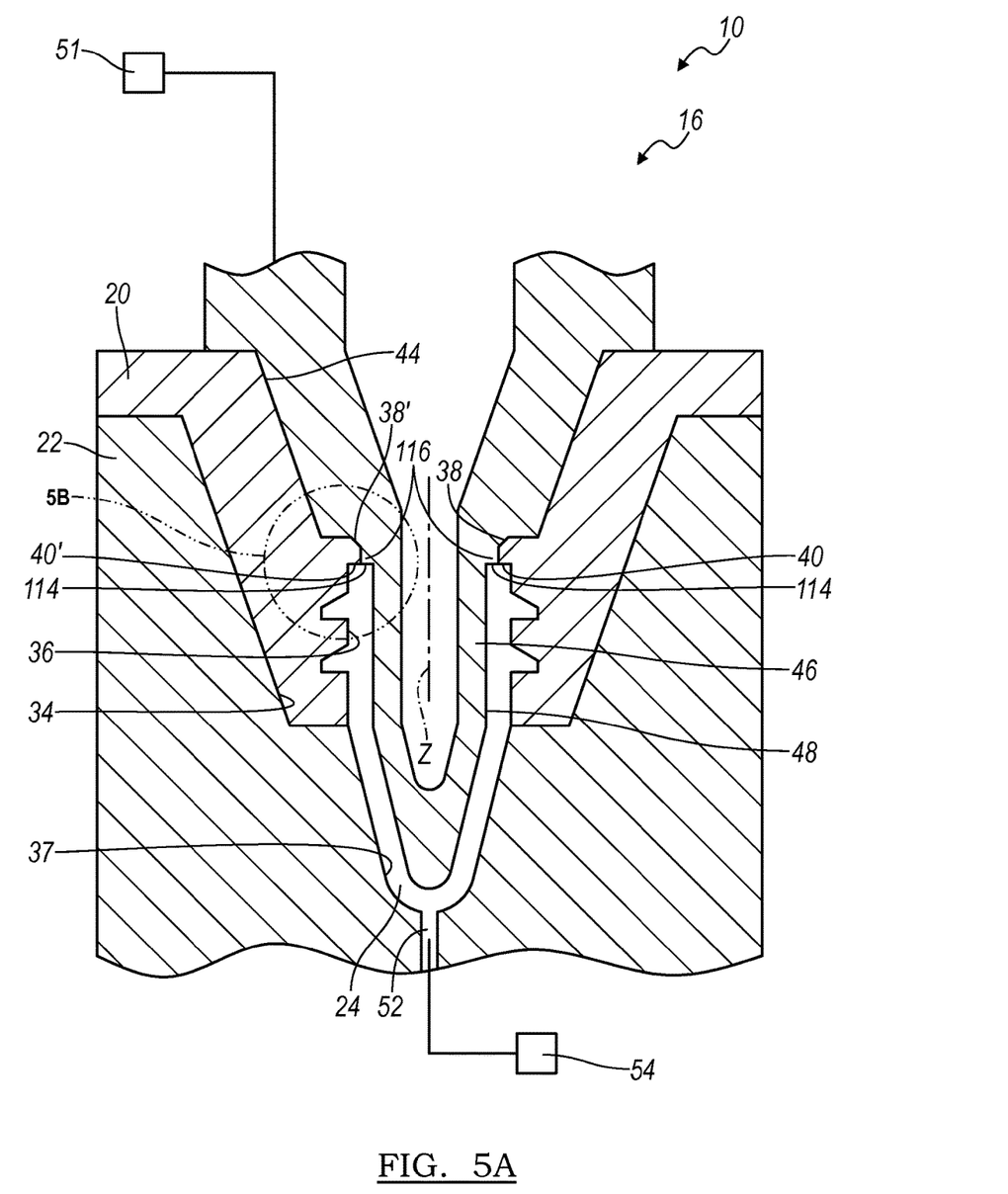
FIG. 5A is a schematic cross-sectional view of the preform molding station of a one-step hydraulic blow molding system according to a second embodiment incorporating the principles of the present invention.

Referring now to FIG. 5A, a second embodiment of a preform forming station 16 of a one-step hydraulic blow molding machine 10 is presented therein. The second embodiment is identical to the embodiment as discussed in connection with FIG. 2A, except for the extent to which the flange 38' encapsulates or extends over the top sealing surface 42 of the finish 28. In the first embodiment, the flange 38 completely defined and was coextensive with the top sealing surface 42, thereby providing a parting line at an upper inward corner of the finish 28. In this second embodiment, the flange 38' does not completely define and is not coextensive with the top sealing surface 42. Rather, the flange 38', and more specifically its lower axial surface 40', only partially defines the top sealing surface 42. The remainder of the top sealing surface 42 is defined by a lower axial surface 114 of a radially outward step 116 that is formed on the exterior surface 48 of the preform projection 46. With this construction, the parting line of the preform 12 is defined on the top sealing surface 42 at the juncture of the flange 38' and the step 116.

In the container forming station 60 associated with the preform forming station 16 of FIG. 5A, the sealing mechanism 200 is constituted primarily by compressive engagement between the axial end face 108 of the injection nozzle 74 and the upper axial face 110 of the neck ring 20, and secondarily by the compressive engagement of the flange 38 on the top sealing surface 42 of the finish 20. A sealing member 202 further forms a positive seal between the injection nozzle 74, neck ring 20 and the top sealing surface 42 of the finish 28 of the preform 12. This is illustrated in the enlarged cross-sectional view of FIG. 5B. Notably, the sealing member 202 is located so as not to engage the parting line on the top sealing surface 42 so as to avoid undesirable wear on the sealing member 202.

Figure 5B:
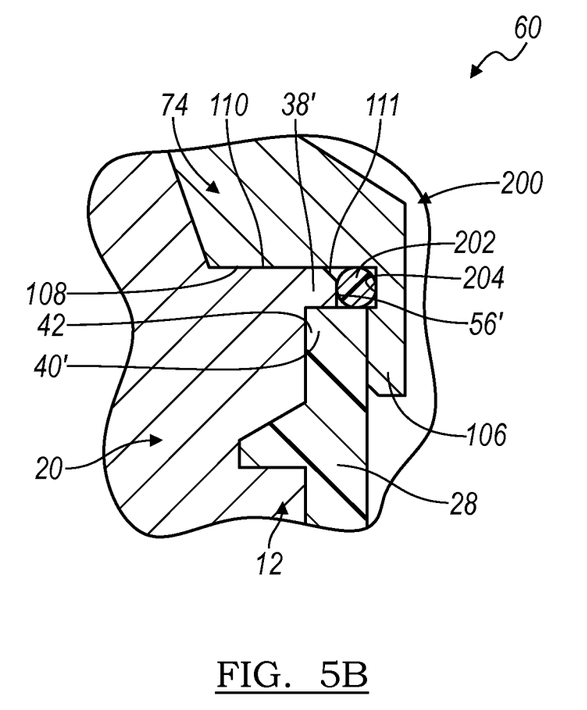
FIG. 5B is an enlarged view of the sealing mechanism of a container forming station associated with the preform forming station of FIG. 5A.

As shown in FIG. 5B, and in a manner similar to some of the variants of the first embodiment, the sealing member 202 is retained within a sealing groove 204 provided at the base of the collar 106 that extends into the finish 28. The positioning of the sealing groove 204 is such that the sealing member 202 is brought by the injection nozzle 74 into engagement with the portion of the top sealing surface 42 that is not encapsulated by the flange 38'. This non-encapsulated portion is the radially inward portion of the top sealing surface 42. The effective outer diameter of the sealing member 202 is provided so that sealing member 202 engages the radially outward facing wall of the sealing groove 204 and the radial inward face 56' of the flange 38'.

As a person skilled in the art will readily appreciate, the above description is meant as an illustration of implementation of the principles this invention. This description is not intended to limit the scope or application of this invention in that the invention is susceptible to modification, variation and change, without departing from spirit of this invention, as defined in the following claims.

We claim:

1. A hydraulic blow molding system for forming a preform and a plastic container from the preform during a one-step container molding process by injecting a liquid product into the preform, the system comprising:
   an injection core having exterior surfaces defining an interior shape of the preform;
   a preform mold assembly having interior surfaces cooperating to defining an exterior shape of the preform;
   a neck ring forming part of the preform mold and including radially inward facing surfaces defining a finish of the preform;
   a forming head including an injection nozzle, the injection nozzle defining a central passageway terminating in an exit orifice, the central passageway defining a central axis therethrough;
   a source of liquid blow medium coupled to the central passageway of the forming head;
   a container mold assembly having interior surfaces cooperating to define a mold cavity in the shape of the plastic container and within which a body of the preform is received;
   the hydraulic blow molding system characterized by
   a sealing mechanism associated with the forming head, whereby the forming head is configured to apply a sealing force in an axial direction, the forming head engaging the neck ring and the sealing mechanism including a primary seal defined between an axial end face of the forming head and an upper axial face of the neck ring to form a seal located above a top sealing surface of the preform whereby molding medium injected into the preform through the central passageway to form the container is prevented from passing between the neck ring and the forming head.

2. The system according to claim 1, wherein the sealing mechanism is further comprised of a secondary seal, the secondary seal at least partially defined between a top sealing surface of the finish and an axial stop surface of the neck ring.

3. The system according to claim 2, wherein the neck ring includes a flange extending radially inward toward to the central axis, the flange contacting the top sealing surface of the finish of the preform.

4. A hydraulic blow molding system for forming a preform and a plastic container from the preform during a one-step container molding process by injecting a liquid product into the preform, the system comprising:

an injection core having exterior surfaces defining an interior shape of the preform;

a preform mold assembly having interior surfaces cooperating to defining an exterior shape of the preform;

a neck ring including radially inward facing surfaces defining a finish of the preform, the neck ring including a flange extending radially inward toward to the central axis, the flange contacting a top sealing surface of the finish of the preform and being coextensive with the top sealing surface;

a forming head including an injection nozzle, the injection nozzle defining a central passageway terminating in an exit orifice, the central passageway defining a central axis therethrough;

a source of liquid blow medium coupled to the central passageway of the forming head;

a container mold assembly having interior surfaces cooperating to define a mold cavity in the shape of the plastic container and within which a body of the preform is received; and a sealing mechanism associated with the forming head, whereby the forming head is configured to apply a sealing force in an axial direction, the forming head engaging the neck ring and the sealing mechanism including a primary seal defined between an axial end face of the forming head and an upper axial face of the neck ring to form a seal whereby molding medium injected into the preform through the central passageway to form the container is prevented from passing between the neck ring and the forming head.

5. The system according to claim 3, wherein the flange is less than coextensive with the top sealing surface of the finish of the preform.

6. The system according to claim 3, wherein the sealing mechanism includes a sealing member engaging the flange.

7. The system according to claim 6, wherein the sealing member is supported on the forming head.

8. The system according to claim 6, wherein the sealing member is provided in a sealing groove defined in the forming head.

9. The system according to claim 6, wherein the sealing member axially engages a face of the flange, the face being generally perpendicular to the central axis.

10. A hydraulic blow molding system for forming a preform and a plastic container from the preform during a one-step container molding process by injecting a liquid product into the preform, the system comprising:

an injection core having exterior surfaces defining an interior shape of the preform;

a preform mold assembly having interior surfaces cooperating to defining an exterior shape of the preform;

a neck ring including radially inward facing surfaces defining a finish of the preform, the neck ring including a flange extending radially inward toward to the central axis, the flange contacting the top sealing surface of the finish of the preform;

a forming head including an injection nozzle, the injection nozzle defining a central passageway terminating in an exit orifice, the central passageway defining a central axis therethrough;

a source of liquid blow medium coupled to the central passageway of the forming head;

a container mold assembly having interior surfaces cooperating to define a mold cavity in the shape of the plastic container and within which a body of the preform is received;

a sealing mechanism associated with the forming head, whereby the forming head is configured to apply a sealing force in an axial direction, the forming head engaging the neck ring and the sealing mechanism including a primary seal defined between an axial end face of the forming head and an upper axial face of the neck ring to form a seal whereby molding medium injected into the preform through the central passageway to form the container is prevented from passing between the neck ring and the forming head, the sealing mechanism including a sealing member engaging a radial face of the flange, the radial face being generally parallel to the central axis.

11. The system according to claim 6, wherein the sealing member engages a radial face of the flange and a top sealing surface of the preform.

12. The system according to claim 6, wherein the sealing member engages an axial end surface of the injection head.

13. The system according to claim 1, wherein the sealing mechanism includes an axial face of the forming head and an upper axial surface of the neck ring.

14. The system according to claim 13, wherein the primary seal is formed exclusively by the axial end face of the forming head and an upper axial surface of the neck ring.

15. A hydraulic blow molding system for forming a preform and a plastic container from the preform during a one-step container molding process by injecting a liquid product into the preform, the system comprising:

an injection core having exterior surfaces defining an interior shape of the preform;

a preform mold assembly having interior surfaces cooperating to defining an exterior shape of the preform;

a neck ring including radially inward facing surfaces defining a finish of the preform; a forming head including an injection nozzle, the injection nozzle defining a central passageway terminating in an exit orifice, the central passageway defining a central axis therethrough;

a seal pin being located in the central passageway and being axially moveable between an extended position and a retracted position along the central axis, in the extended position the seal pin engaging the injection nozzle and sealing off the exit orifice, in the retracted position the seal pin being disengaged from the injection nozzle and permitting the injection of blowing medium through the exit orifice and into the preform;

a source of liquid blow medium coupled to the central passageway of the forming head;

a container mold assembly having interior surfaces cooperating to define a mold cavity in the shape of the plastic container and within which a body of the preform is received; and a sealing mechanism associated with the forming head, whereby the forming head is configured to apply a sealing force in an axial direction, the forming head engaging the neck ring and the sealing mechanism including a primary seal defined between an axial end face of the forming head and an upper axial face of the neck ring to form a seal whereby molding medium injected into the preform through the central passageway to form the container is prevented from passing between the neck ring and the forming head.

16. The system according to claim 1, wherein the neck ring is a thread split made of two halves adapted to form the threads of the neck and to be removed from the neck after the container forming.

17. A hydraulic blow molding method for forming a preform and a plastic container from the preform during a one-step container molding process by injecting a liquid product into the preform, the method comprising the steps of:

forming a preform in a preform forming station by injecting a plastic material into a preform mold assembly having interior surfaces cooperating with an injection core and a neck ring to defining a shape of the preform;

retaining the preform in the neck ring and transferring the preform to a container molding station;

injecting a liquid end product into the preform to cause expansion of the preform to form a liquid filled container; the method characterized by compressively engaging an axial end face of the forming head with an upper axial surface of the neck ring forming a primary seal of a sealing mechanism located above the finish of the preform and in which a sealing force is applied in an axial direction of the preform; whereby the liquid end product injected into the preform to form the container is prevented from passing between the neck ring and the forming head.

18. The method according to claim 17, further characterized by the step of forming a secondary seal between a top sealing surface of the preform and an axial surface of the neck ring.

19. The method according to claim 18, wherein the axial surface of the neck ring is defined on a flange of the neck ring extending over the top sealing surface of the preform.

20. The method according to claim 18, wherein the axial surface of the neck ring is defined on a flange of the neck ring extending only partially over the top sealing surface of the preform.

21. The method according to claim 17, further characterized by the step of engaging a sealing member between the neck ring and the forming head.

22. The method according to claim 21, wherein the sealing member is engaged with a radial surface of the neck ring.

23. The method according to claim 21, wherein the sealing member is engaged with an axial surface of the neck ring.

24. The method according to claim 21, wherein the sealing member is engaged with a chamfered surface of the neck ring.

* * * * *